United States Patent
Bohner et al.

(10) Patent No.: US 6,814,177 B2
(45) Date of Patent: Nov. 9, 2004

(54) VEHICLE STEERING SYSTEM

(75) Inventors: Hubert Bohner, Böblingen (DE); Martin Moser, Fellbach (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/781,091

(22) Filed: Feb. 17, 2004

(65) Prior Publication Data

US 2004/0168848 A1 Sep. 2, 2004

Related U.S. Application Data

(62) Division of application No. 09/374,900, filed on Aug. 13, 1999, now Pat. No. 6,712,174.

(30) Foreign Application Priority Data

Aug. 13, 1998 (DE) .......................................... 198 36 679

(51) Int. Cl.[7] .................................................. B62D 5/00
(52) U.S. Cl. ......................................... 180/402; 280/89
(58) Field of Search .................................. 180/402, 403, 180/400, 417, 444; 280/89

(56) References Cited

U.S. PATENT DOCUMENTS

| | | |
|---|---|---|
| 3,138,069 A | 6/1964 | Bishop |
| 4,352,304 A | 10/1982 | Warner |
| 4,391,342 A | 7/1983 | Nishikawa et al. |
| 4,522,279 A | 6/1985 | Kanazawa |
| 4,922,761 A | 5/1990 | Onishi et al. |
| 5,062,494 A | 11/1991 | Okamoto et al. |
| 5,097,917 A | 3/1992 | Serizawa et al. |
| 6,059,068 A | 5/2000 | Kato et al. |
| 6,076,626 A | 6/2000 | Bohner et al. |
| 6,112,844 A | 9/2000 | Bohner et al. |
| 6,122,579 A | 9/2000 | Collier-Hallman et al. |

FOREIGN PATENT DOCUMENTS

DE        195 40 956        3/1997

*Primary Examiner*—Daniel G. DePumpo
(74) *Attorney, Agent, or Firm*—Kenyon & Kenyon

(57) ABSTRACT

A vehicle steering system has a steering grip, in particular a steering wheel, which is operated by the driver, an actuating unit which operates steered vehicle wheels, and a manual force regulator which is coupled via a flexible coupling element with the steering grip and simulates parameter-dependent steering forces on the steering grip.

A damping device is provided for reducing the formation of vibrations between the steering grip and the manual force regulator. The damping device interacts with the steering grip either directly or indirectly to damp relative motions between the steering grip and the manual force regulator.

9 Claims, 2 Drawing Sheets

VEHICLE STEERING SYSTEM

CROSS-REFERENCE TO RELATED APPLICATIONS

This application is a division of U.S. patent application Ser. No. 09/374,900, filed on Aug. 13, 1999, now U.S. Pat. No. 6,712,174 which is expressly incorporated herein in its entirety by reference thereto.

FIELD OF THE INVENTION

The present invention relates to a vehicle steering system.

RELATED TECHNOLOGY

Vehicle steering systems suitable for "steer-by-wire" operation have been described. In such systems, a driver can enter a steering command into the vehicle steering system from the steering grip, usually a steering wheel, by exerting a manual force on the steering wheel, thus causing the steering wheel to turn. A steering angle setpoint generator determines that the steering wheel has been turned and communicates this information to a controller arrangement of the vehicle steering system. The controller arrangement also interrogates the steering angle currently set at steerable vehicle wheels using a steering angle actual-value sensor and carries out a setpoint/actual-value comparison of the steering angle. From this comparison, the controller arrangement derives a control command for an actuating unit, which operates the steerable vehicle wheels accordingly.

A steering system of this type also has a manual force regulator that simulates manual steering forces or steering forces on the steering wheel. Steering forces of this type can be, for example, a resistance counteracting the manual steering force and/or lateral forces acting upon the steerable vehicle wheels. A manual force regulator of this type is used primarily to improve vehicle response and thus helps improve control over the vehicle.

Vehicle steering systems of this type do not need a conventional drive link between the steerable vehicle wheels and the steering wheel. However, a mechanical or hydraulic drive of this type is frequently also provided and can be activated upon reaching an "emergency level", thus creating a redundant steering system.

Because the steering grip in a vehicle steering system of this type is flexibly coupled with the manual force regulator via a flexible coupling element, in particular via a spring device, the arrangement composed of the manual force regulator, coupling element, and steering grip forms an oscillating system. Vibrations occurring in the vehicle or in the steering system can therefore be transmitted to this arrangement and produce relative motions between the manual force regulator and steering grip. The relative motions produced in this manner can, in turn, lead to changes in the values at the setpoint generator, thus producing unwanted control or steering motion at the steered vehicle wheels.

Vibrations, in particular torsional vibrations of the steering grip, can also produce unwanted driving angle variations or driving angle vibrations, for example if the driver releases the steering wheel while it is in a steering state in which the manual force regulator simulates a manual force. In this case, the flexibility of the coupling element produces a steering countermotion which the manual force regulator cannot counteract quickly enough. The delayed resistive force of the manual force regulator can then support the return vibration of the steering wheel which has already begun. Disadvantageously, these vibrations and countervibrations can escalate. During steering wheel movement, new steering angle setpoints are constantly being generated which produce corresponding control events and steering movement at the steered wheels.

SUMMARY OF THE INVENTION

An object of the present invention is to provide a vehicle steering system which reduces the formation of vibrations between the steering grip and the manual force regulator.

The present invention provides a vehicle steering system having a steering grip (9), in particular a steering wheel, which is operated by the driver; an actuating unit (4) which operates steered vehicle wheels (1); a steering-angle setpoint generator (10) which is operated by the steering grip (9); a steering-angle actual-value sensor (21) which is operated by the steered vehicle wheels (1); a controller arrangement (19) which activates the actuating unit (4) as a function of a setpoint/actual-value comparison of the steering angle; and a manual force regulator (12) which is coupled via a flexible coupling element (11) with the steering grip (9) and simulates parameter-dependent steering forces on the latter, characterized in that a damping device (27) are provided which interact with the steering grip (9) either directly or indirectly and damp relative adjusting motions between the steering grip (9) and the manual force regulator (12).

The present invention is based on the general idea of damping the relative motions between the steering grip and the manual force regulator, in particular the movements of the steering grip, with the help of a correspondingly arranged damping device. This action reduces the tendency of the oscillating system formed by the manual force regulator, flexible coupling element, and steering grip to vibrate.

Because the steering angle setpoint generator is usually coupled with the steering grip, damping the movements of the steering grip causes unwanted movements of the steering grip to produce only minor changes, or none at all, in the setpoint steering angle, thus producing correspondingly minor changes in the actual steering angle. This reduces the danger of vibrations in the steering system.

According to one advantageous embodiment of a vehicle steering system according to the present invention, the flexible coupling element can be designed in the form of a shaft composed of a first and a second shaft section. The one shaft section is rigidly connected to the manual force regulator, while the other shaft section is rigidly connected to the steering grip. Both shaft sections are coupled with one another by a spring device, such as a C-spring or a torsion bar or torque rod, thus allowing them to rotate relative to one another against the elastic resistance. In an embodiment of this type, the damping device is arranged so that it damps the rotations of the shaft sections relative to one another.

Further important features and advantages of a vehicle steering system according to the present invention may be understood from the description below.

The features described above, and those still to be explained below can, of course, be used not only in the combinations mentioned but also in other combinations or even by themselves without exceeding the scope of the present invention.

BRIEF DESCRIPTION OF THE DRAWINGS

A preferred embodiment of the present invention is illustrated in the drawings and explained in greater detail in the following description, in which.

DETAILED DESCRIPTION

Figure 1:
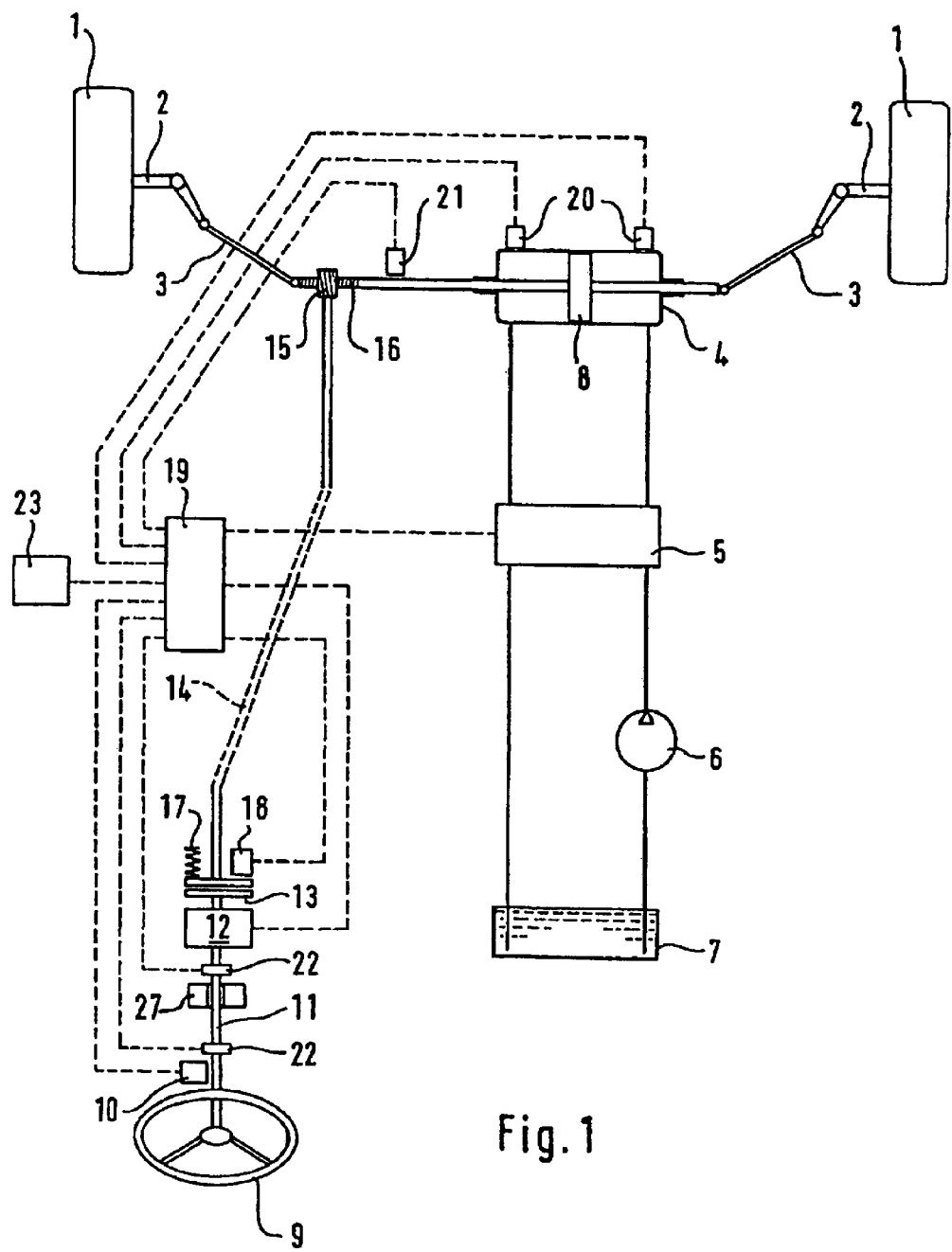
FIG. 1 shows a schematic representation, similar to a circuit diagram, of a vehicle steering system according to the present invention.

As shown in FIG. 1, a motor vehicle (not illustrated in greater detail) has, as usual, two front steerable vehicle wheels 1 which are arranged on a spring-suspension wheel mount 2 relative to the vehicle structure, with each mount being able to rotate around a vertical vehicle axis thus allowing the assigned vehicle wheel 1 to be steered. Wheel mounts 2 are connected via steering tie rods 3 to an actuating unit 4, which is hydraulic in the present example and is designed as a dual-action, hydraulic piston/cylinder unit. The two hydraulic chambers of actuating unit 4, which are separated from one another by a piston 8 of actuating unit 4, can be connected via an electromagnetic control valve 5 to the delivery side of a hydraulic pressure source, a hydraulic pump 6 in the present example, and to a relatively pressure-less hydraulic reservoir 7 which also communicates with the suction side of hydraulic pump 6. Depending on the position of control valve 5, hydraulic actuating unit 4 can generate a controllable actuating force in one direction or the other or either change or maintain the set position.

A steering wheel 9 operated by the driver controls a setpoint generator 10 whose electrical output signals represent the setpoint of the steering angle of steerable vehicle wheels 1, or a corresponding quantity.

In addition, a flexible coupling element, which in the embodiment is designed as a torsionally flexible shaft or shaft arrangement 11, establishes a drive link between steering wheel 9 and an electric motor 12, which functions as a manual force regulator and is used in the manner described below to generate a manual steering force that can be felt on steering wheel 9.

A drive link is also established between steering wheel 9 and a steering gear component of steerable vehicle wheels 1 by shaft or shaft arrangement 11 as well as a clutch 13 and a shaft train 14, or by another drive link, such as a hydraulic one, for example. In the illustrated example, shaft train 14 leads to a pinion 15 which engages with a rack 16 adjacent to the piston rod of hydraulic actuating unit 4.

A closing force against which clutch 13 can be brought into an open position or held in the open position by an electric servomotor 18 is continuously applied to clutch 13, for example, by a closing spring 17.

A computer-supported controller arrangement 19 is connected on the input side to setpoint generator 10 for the steering angle and sensors 20 whose signals are correlated to the steering forces that are present at steerable vehicle wheels 1. For example, sensors 20 can detect the hydraulic pressures in actuating unit 4. The pressure difference between the two chambers of actuating unit 4 is a measure of the effective steering forces as far as the sign and amount are concerned.

Controller arrangement 19 is also connected on the input side to a displacement sensor or steering angle actual-value sensor 21 which detects the stroke of a steering gear component, in this case the piston rod of actuating unit 4, and thus detects a quantity corresponding to the actual value of the steering angle of wheels 1.

Two rotation angle sensors 22, from whose signals the flexible rotation of shaft or shaft arrangement 11 can be determined, are also connected to the input side of controller arrangement 19.

Finally, the input side of controller arrangement 19 can also be connected to sensors 23 which are used to detect predetermined parameters such as the transverse acceleration and/or yaw rate of the vehicle.

The output side of the controller arrangement is connected to control valve 5, electric motor 12, and servomotor 18.

During normal operation, i.e., when controller arrangement 19, which is constantly checking itself for proper functioning, does not detect a malfunction, servomotor 18 is driven by controller arrangement 19 so that it holds clutch 13 open against the continuous closing force of closing spring 17, without any forced coupling taking place between steering wheel 9 and steerable vehicle wheels 1.

As a function of the signals of setpoint generator 10, which is operated by steering wheel 9, controller arrangement 19 controls control valve 5 so that actuating unit 4 performs a stroke to steer vehicle wheels 1, with this stroke adjusting the actual value of the steering angle detected by displacement sensor 21 to the steering angle setpoint provided by setpoint generator 10. If necessary, this setpoint can be modified by signals from sensors 23 to at least partially compensate for any disturbing forces, such as cross-wind effects, acting upon the vehicle.

Controller arrangement 19 also determines a manual steering force setpoint, which can be felt on steering wheel 9, from the signals of sensors 20, which represent the effective steering forces on vehicle wheels 1, as well as any signals provided by other sensors or signal generators, e.g., signals for road speed. Electric motor 12 is driven as a function of this setpoint, with the relevant actual value of the manual steering force being determined from the signals of rotation angle sensors 22. The difference between the rotation angles detected by rotation angle sensors 22 is a measure of the flexible rotation of shaft or shaft arrangement 11 and thus a measure of the effective torque between steering wheel 9 and electric motor 12, which corresponds to the force that can be felt on steering wheel 9.

In the operating situation described above, the steering system is in steer-by-wire mode without any forced coupling by drive 14, which has a mechanical design in this case.

If controller arrangement 19 detects a malfunction during its function check, the control magnets of control valve 5 are taken off-line, so that springs or similar devices (not illustrated) place them in a neutral position where hydraulic actuating unit 4 is hydraulically switched to idle. In addition, servomotor 18 of clutch 13 is taken off-line, thus causing clutch 13 to be closed by its closing spring 17 and establishing a forced coupling between steering wheel 9 and steered vehicle wheels 1.

If the driver now turns steering wheel 9, shaft or shaft arrangement 11 is turned according to the forces or torques transmitted between steering wheel 9 and steerable vehicle wheels 1. This makes it possible for electric motor 12 to be controlled as a function of these forces and torques, thus reducing the amount of manual force that the driver must exert for steering the vehicle during this operating phase. This also means that electric motor 12 now takes over the function of a servomotor. Controlling the electric motor as a function of the signals from rotation angle sensor 22 can be handled by a separate control circuit in controller arrangement 19 provided for this operating mode. This control circuit is automatically activated when clutch 13 closes.

Additionally or alternatively, hydraulic actuating unit 4 can be used as a servomotor when clutch 13 closes. For this purpose, a further, separate control circuit in controller arrangement 19 operates control valve 5 as a function of the signals from rotation angle sensor 22 so that actuating unit 4 generates a control force that is used to reduce the difference in rotation angles detected by rotation angle sensor 22.

Figure 2:
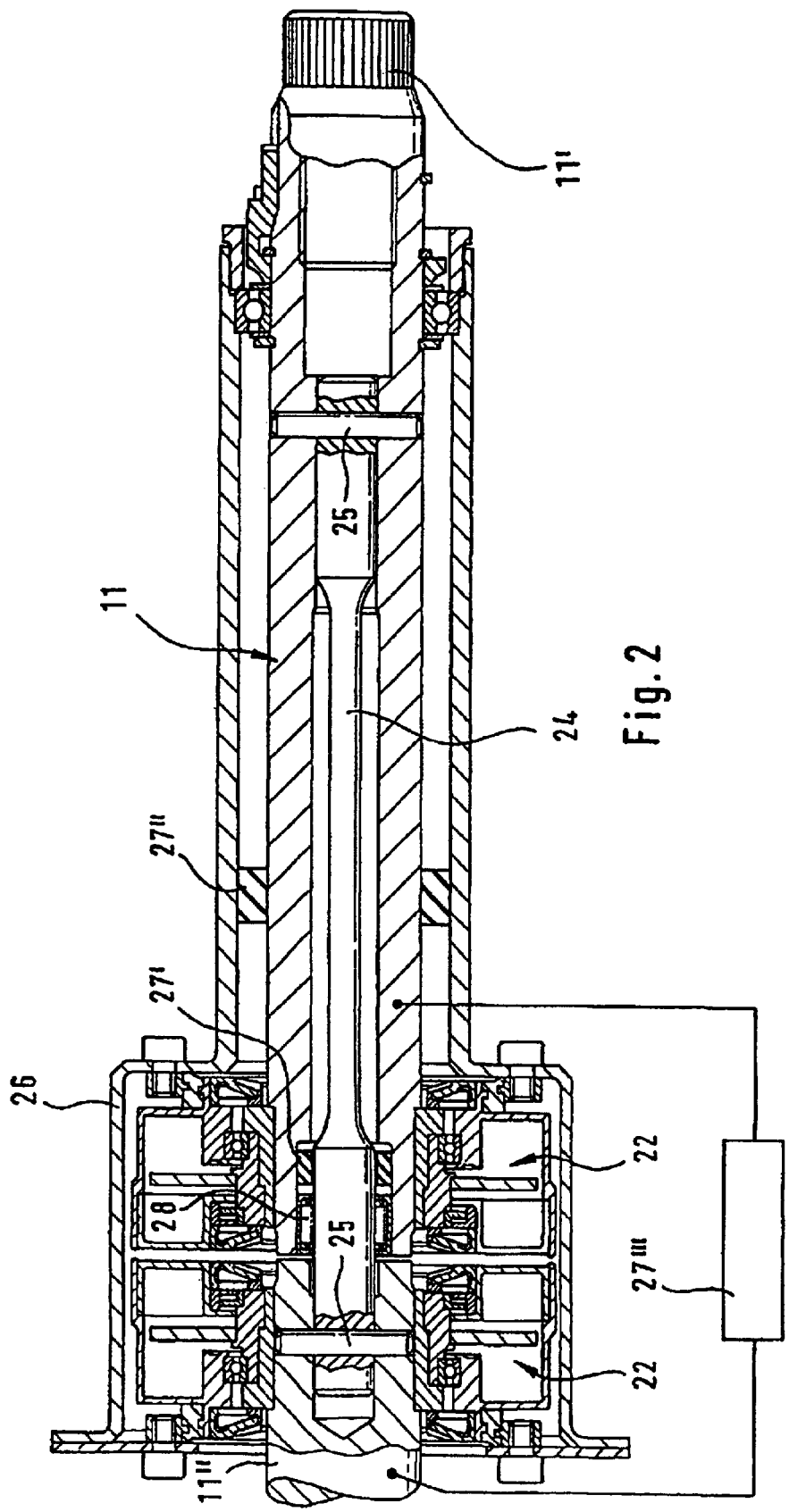
FIG. 2 shows a schematic representation of a longitudinal cross-section of a flexible shaft arrangement that establishes a drive link between a steering grip and a manual force regulator to simulate a manual steering force.

FIG. 2 shows one advantageous embodiment of shaft or shaft arrangement 11.

As shown in FIG. 2, a shaft section 11', which is connected to steering wheel 9 (not shown in this figure—see FIG. 1), is flexibly coupled with a shaft section 11" via a torsion bar or torque rod 24, with shaft section 11', in turn, being connected to electric motor 12 (see FIG. 1) or forming the latter's motor shaft. Torsion bar 24 is positioned in corresponding axial holes in shaft sections 11' and 11", and its axial ends are each rigidly fastened to corresponding shaft sections 11' and 11" by pins 25. Pins 25 penetrate aligned cross holes in shaft sections 11' and 11" as well as the end pieces of torsion bar 24. The torsional flexibility of torsion bar 24 therefore produces a relative rotation between shaft sections 11' and 11" when a torque is transmitted, with the direction and magnitude of this relative rotation depending on the direction and magnitude of the torque.

At least one C-spring can also be used instead of a torsion bar 24 as the spring device for flexibly coupling shaft sections 11' and 11".

This relative rotation is detected by both rotation angle sensors 22, which are located at the adjacent ends of both shaft sections 11' and 11" and which detect the relative rotation of assigned shaft section 11' or 11" relative to a stationary housing 26.

In the illustrated embodiment, rotation angle sensor 22 assigned to shaft section 11' can also perform the function of setpoint generator 10 for the steering angle so that this setpoint generator 10 does not need to be provided as a separate part or can form a redundant arrangement with above-mentioned rotation angle sensor 22 for the steering angle setpoint.

Shaft sections 11' and 11" are flexibly interconnected via torsion bar 24 and form an oscillating system. In steer-by-wire mode, for example, vibrations can occur when steering wheel 9 is released by mistake during relatively large manually applied steering forces or steering torques, e.g., when the vehicle leaves a parking spot or when making a turn. The spring force of torque rod or torsion bar 24 then produces a return motion which oscillates beyond the neutral central position. Controller arrangement 19 does not recognize that the movement of steering wheel 9 was not intended by the driver, so that these vibrations also produce vibrating steering motions at steered vehicle wheels 1, causing the vehicle to swerve, which makes it harder to control the vehicle. Disadvantageously, this can also result in control commands which support and possibly reinforce the vibratory action (resonance). The steering motions of steerable vehicle wheels 1 produced by this can then pose a danger to the vehicle and to the other vehicles in traffic.

To reduce the tendency of this system to vibrate, corresponding damping device 27 shown in FIG. 1 is provided which interacts with shaft arrangement 11. Damping device 27 damps the relative motions between steering grip 9 and manual force regulator 12. In other words, damping device 27 produces a resistive force which counteracts a relative rotation between steering wheel 9 and manual force regulator 12 and which depends on the speed of this relative rotation. For example, the faster steering wheel 9 turns in relation to electric motor 12, the greater is the damping force of damping device 27 counteracting this motion.

As shown in FIG. 2, damping 27 can be designed in one variant as a friction member or friction element 27' which engages with both first shaft section 11' assigned to steering wheel 9, and torsion rod 24 with the help of corresponding friction surfaces. Friction member 27' engages with an axial end region of torsion bar 24, which is designed to be relatively torsion-proof and is rigidly connected to second shaft section 11" assigned to electric motor 12. In the embodiment, friction element 27' is located next to a bearing 28 in the axial direction and can be made, for example, of an elastomer. An embodiment is also possible in which the material of friction element 27' is correspondingly selected so that the latter simultaneously functions as bearing 28, thus replacing the latter.

In this first variant, damping element 27' interacts with shaft sections 11' and 11", which move relative to one another, so that is makes little difference whether steering wheel 9 is connected to the one shaft section 11' or to the other shaft section 11".

According to a second variant, which is also sketched in FIG. 2, a damping element 27, which can also be designed as a friction element or friction member 27", engages with shaft section 11' assigned to steering wheel 9 as well as with a stationary component, housing 26 in this case. This second variant also reduces the tendency toward vibrations between steering wheel 9 and manual force regulator 12. However, damping element 27" in this second variant should engage with the shaft section (11' in this case) that is assigned to steering wheel 9, since steering wheel 9 is usually coupled with steering angle setpoint generator 10. To avoid unnecessary control and unnecessary steering angle displacement at steered wheels 1 caused by vibrations between steering wheel 9 and manual force regulator 12, the rotations of steering wheel 9, and thus activation of setpoint generator 10, must be reduced.

FIG. 2 also illustrates a third variant. According to this third variant, damping device 27 can be designed as an electric or electronic damping element 27''' which interacts, for example, with shaft sections 11' and 11" rotating relative to one another, as shown in FIG. 2. An electronic damping system can be provided, for example, by filtering out vibrations above a specific limit frequency so that variations in steering angle detectable by setpoint generator 10 at frequencies above this limit are not converted by controller arrangement 19 into corresponding motions at actuator unit 4.

To function as an electric damper, damping element 27''' can be designed, for example, as an eddy-current brake which engages, for example, with shaft section 11' and shaft section 11" or with shaft section 11' and housing 26. A damping system implemented in this manner can also be controlled and makes it possible, for example, to distinguish between rapid steering motions intended by the driver, which should remain undamped, and undesired steering motions produced by vibrations, which do need to be damped.

Instead of damping device 27 described in the above variants, another suitable mechanical, hydraulic or electric damping device can be used to damp the relative motions between steering grip 9 and manual force regulator 12, thus reducing the tendency to vibrate.

What is claimed is:

1. A steering system for a vehicle, the steering system comprising:

a steering grip operable by a driver;

an actuating unit for operating steered vehicle wheels of the vehicle;

a steering angle setpoint generator for responding to the steering grip and producing a steering angle setpoint signal;

a steering angle actual-value sensor for responding to the steered vehicle wheels and producing an actual steering angle value signal;

a controller arrangement for activating the actuating unit as a function of a comparison between the steering angle setpoint signal and the actual steering angle value signal;

a manual force regulator coupled via a flexible coupling element with the steering grip, the manual force regulator for simulating steering forces on the steering grip; and a damping device for interacting with the steering grip directly or indirectly to dampen relative adjusting motions between the steering grip and the manual force regulator;

wherein the damping device operates at least one of electrically, electronically and magnetically.

2. The steering system as recited in claim 1, wherein the steering grip is a steering wheel.

3. The steering system as recited in claim 1, wherein the coupling element includes a shaft, the shaft including a first shaft section rigidly connected to the steering grip and a second shaft section rigidly connected to the manual force regulator, the first shaft section being coupled with the second shaft section via a spring device, the first and second shaft sections being capable of rotating relative to one another against an elastic resistance, the damping device being capable of damping the rotating of the first and second shaft sections relative to one another.

4. The steering system as recited in claim 3, wherein the spring device includes at least one of a torque rod and a C-spring rigidly connected to the first and second shaft sections.

5. The steering system as recited in claim 1, wherein the damping device engages: at least one of the steering grip and a first component rigidly connected to the steering grip; and at least one of the manual force regulator, a second component rigidly connected to the manual force regulator and a third component stationary relative to, the steering grip.

6. The steering system as recited in claim 5, wherein the coupling element includes a shaft, the first component including a first shaft section of the shaft and the second component including a second shaft of the shaft.

7. The steering system as recited in claim 5, wherein the third component is a housing member.

8. A steering system for a vehicle, the steering system comprising:

a steering grip operable by a driver;

an actuating unit configured to operate steered vehicle wheels of the vehicle;

a steering angle setpoint generator configured to respond to the steering grip and to produce a steering angle setpoint signal;

a steering angle actual-value sensor configured to respond to the steered vehicle wheels and to produce an actual steering angle value signal;

a controller arrangement configured to activate the actuating unit as a function of a comparison between the steering angle setpoint signal and the actual steering angle value signal;

a manual force regulator coupled via a flexible coupling element with the steering grip, the manual force regulator configured to simulate steering forces on the steering grip; and a damping device configured to interact with the steering grip directly or indirectly to dampen relative adjusting motions between the steering grip and the manual force regulator;

wherein the damping device is configured to operate at least one of electrically, electronically and magnetically.

9. A steering system for a vehicle, the steering system comprising:

steering grip means operable by a driver;

actuating means for operating steered vehicle wheels of the vehicle;

steering angle setpoint generating means for responding to the steering grip and producing a steering angle setpoint signal;

steering angle actual-value sensing means for responding to the steered vehicle wheels and producing an actual steering angle value signal;

controlling means for activating the actuating unit as a function of a comparison between the steering angle setpoint signal and the actual steering angle value signal;

manual force regulating means coupled via a flexible coupling element with the steering grip, the manual force regulating means for simulating steering forces on the steering grip; and damping means for interacting with the steering grip directly or indirectly to dampen relative adjusting motions between the steering grip and the manual force regulator;

wherein the damping means operates at least one of electrically, electronically and magnetically.

* * * * *